United States Patent [19]

Deguchi et al.

[11] Patent Number: 4,539,664
[45] Date of Patent: Sep. 3, 1985

[54] CONTROL SYSTEM FOR OPTICAL INFORMATION SIGNAL REPRODUCTION DEVICE

[75] Inventors: Masahiro Deguchi; Mitsuro Moriya; Noboru Wakami; Yasuhiro Goto; Kazuharu Shiragami, all of Osaka, Japan

[73] Assignee: Matsushita Electric Industrial Co., Ltd., Osaka, Japan

[21] Appl. No.: 380,343

[22] Filed: May 20, 1982

Related U.S. Application Data

[63] Continuation-in-part of Ser. No. 309,461, Oct. 7, 1981, abandoned, which is a continuation of Ser. No. 69,331, Aug. 24, 1979, abandoned.

[30] Foreign Application Priority Data

Aug. 25, 1978 [JP] Japan .................................. 53-104038
Aug. 25, 1978 [JP] Japan .................................. 53-104039

[51] Int. Cl.³ .......................... G11B 7/00; G11B 21/08
[52] U.S. Cl. ....................................... 369/44; 358/907; 358/342
[58] Field of Search ....................... 369/32, 33, 41, 44; 365/215, 234; 360/10.2, 14.2, 77, 78, 10.1; 358/342, 907

[56] References Cited

U.S. PATENT DOCUMENTS 4,138,663  2/1979  Lehureau et al. ..................... 369/44
4,397,009  8/1983  Eriksson ............................... 369/32

FOREIGN PATENT DOCUMENTS

56-83874  7/1981  Japan .................................... 360/32

Primary Examiner—Robert L. Richardson
Attorney, Agent, or Firm—Burgess, Ryan & Wayne

[57] ABSTRACT

In a device for reproducing the information, especially the video signal optically, magnetically or otherwise recorded on the spiral or concentric track on a disk-shaped recording medium, a control system for controlling the radially inward or outward shift or jump of a reproduction transducer from one track to another for effecting, in addition to the normal reproduction, the special effect reproductions such as still picture, slow, fast and reverse motions. The control system comprising a shifting means for shifting or jumping the transducer in the radial directions substantially perpendicular to the tracks, a control means for maintaining the transducer to scan the desired track, and a detecting means for detecting whether or not the transducer has been shifted or jumped and brought to the desired track and generating the output signal in response to which the shifting means is disabled to decelerate and stop the shifting or jumping of the transducer.

8 Claims, 29 Drawing Figures

CONTROL SYSTEM FOR OPTICAL INFORMATION SIGNAL REPRODUCTION DEVICE

The application is a continuation-in-part of U.S. patent application Ser. No. 309,461 filed Oct. 7, 1981, to the same applicants, now abandoned, which in turn is a Continuation of U.S. patent application Ser. No. 69,331, filed Aug. 24, 1979 to the same applicants, now abandoned.

BACKGROUND OF THE INVENTION

The present invention relates to a control system for a device for reproducing the information signal optically recorded on a recording medium.

For instance, in an optical reproduction device available in the prior art, the light beam emitted from a light source is focused on a disk-shaped recording medium (to be referred to as "the recording medium" for brevity in this specification) and is controlled to trace or track a spiral or concentric track produced on the recording medium. The light reflected from or passing through the recording medium is detected by a light sensor. In general, a He-Ne laser or a semiconductor laser is used as such a light source. Audio and/or video signals are recorded on the recording medium in the form of patterns produced by making the surface thereof uneven or light-and-dark image patterns. The recording density is so thick that the signal track is usually about one micron in width and the track pitch is about two microns. Therefore, the light beam must be focused on a small portion having a diameter of about one micron. As a result, a converging or condenser lens having a greater aperture number and a shorter focal length must be used. In addition, the light beam must be so controlled that it is focused correctly on a desired portion of the recording medium. Since the focusing system proper is not included in the subject matter of the present invention, no further description will be presented in this specification.

By means of an optical reproduction device of the type described above, available are various reproduction modes, such as, still picture and slow, quick and/or reverse motions, which will be referred to as "the special effect reproduction modes" in this specification. For the purpose to realize "the special effect reproduction modes" employing such an optical reproduction device available in the prior art, the tracking control system which controls to keep the focused point of the light beam tracing a desired track, is suspended the operation and then some positive and negative rectangular pulses are applied to a tracking element. Thereafter, the tracking control system is caused to resume the operation. In this system, the criteria or the manner of shift or displacement of the light beam depends upon the characteristics or performance of the tracking elements employed so that the width and amplitude of the pulse applied to the tracking element must be adjusted depending upon the characteristics or performance of the element. This adjustment is very troublesome and time-consuming. Furthermore, it is difficult with the prior art system to correctly shift the light beam from one track to another, to skip or jump more than one track. In addition, if a recording track is distorted in pattern because of the eccentricity or some other reasons, and if the pitch between the tracks varies or is irregular, even an ordinary shift or a simple jumping to the adjacent track cannot be realized.

SUMMARY OF THE INVENTION

One of the objects of the present invention is, therefore, to provide a control system employable for an information reproduction device of the type described above, whereby the information, especially the video signal, may be reproduced at a speed different from that at which the information, especially the video signal, was recorded, resultantly enabling the above described special effect reproductions.

Another object of the present invention is to provide a control system which may enable the correct shift or jumping of a scanning point from one track to another, whereby the special effect reproductions and/or the high speed information retrieval may be realized in a reliable or stable manner.

A further object of the present invention is to provide a control system which can be incorporated in an information retrieval system of the type referred to above for retrieving and reproducting the desired one of the video signals which are recorded on the recording medium and given addresses.

Briefly stated, for the purpose to realize the above presented objects or others, a control system for an information signal reproduction device in accordance with the present invention is provided a transducer means for reproducing the information recorded on tracks on a recording medium, a shifting means for shifting the scanning or reproduction position of the transducer means in the direction substantially perpendicular to the tracks, a control means adapted to maintain the scanning or reproduction position of the transducer means to track the desired track, and a detecting means for detecting whether or not the scanning or reproduction position has been shifted and brought to the desired track.

The above and other objects, advantages and features of the present invention will become more apparent from the following description of two preferred embodiments thereof presented in conjunction with the accompanying drawings.

BRIEF DESCRIPTION OF THE DRAWINGS

FIG. 2 (a)-(d) is a view used for explanation of the special reproduction modes;

Same reference numerals are used to designate similar components throughout the figures.

PREFERRED EMBODIMENTS OF THE INVENTION

First Embodiment, FIGS. 1 through 8

Figure 1:
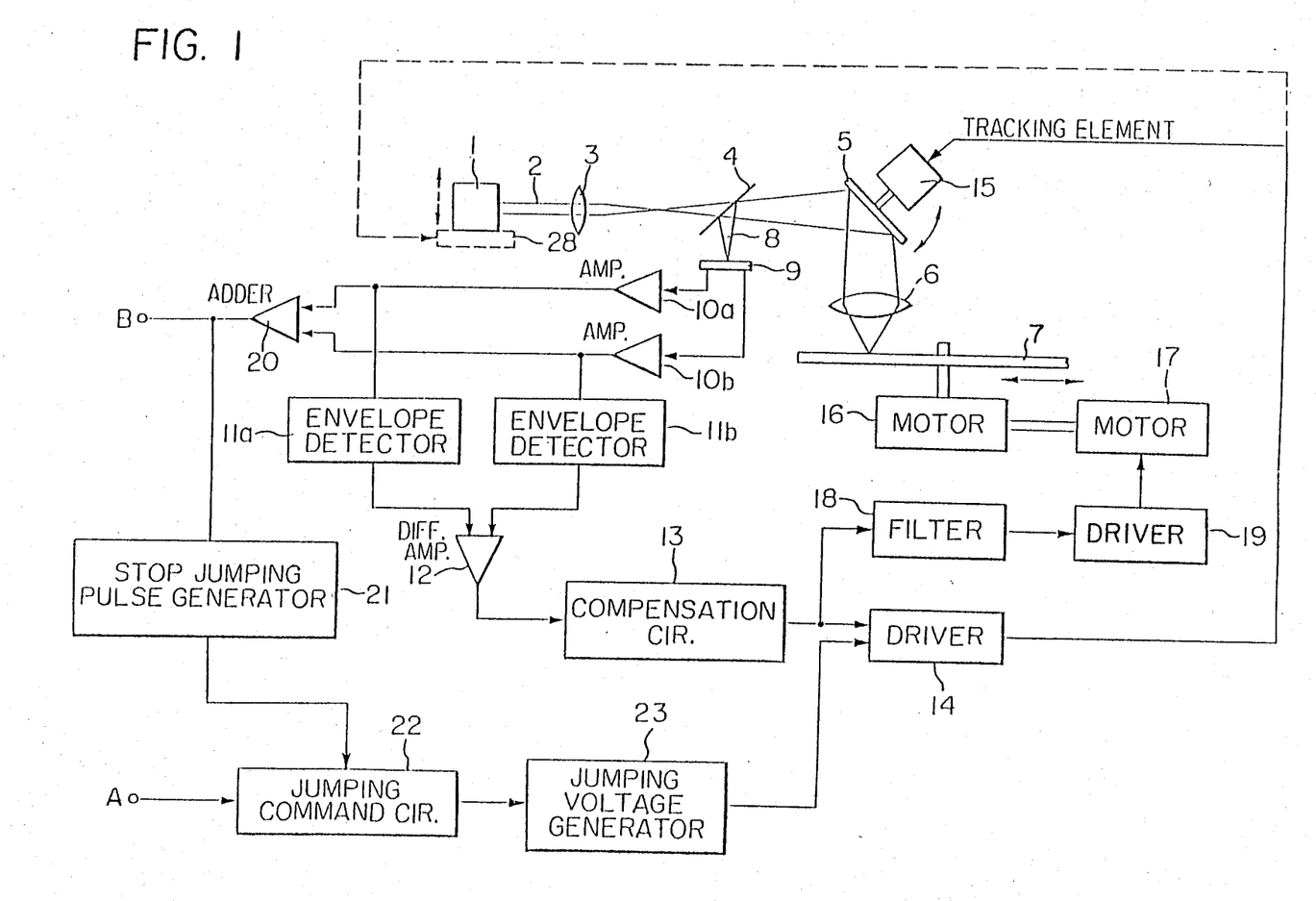
FIG. 1 is a block diagram of a first embodiment of the present invention.

Referring to FIG. 1, a light beam 2 from a light source 1 passes through a spot lens 3 and a half mirror 4, is redirected by a reflecting mirror 5 and is converged or focused by a converging lens 6 on a recording medium 7, passes through the converging lens 6 in the opposite direction, and is redirected by the reflecting mirror 5 and the half mirror 4 toward a split type light sensor 9. The outputs of the light sensor 9 are amplified by amplifiers 10a and 10b, and are detected by envelope detectors 11a and 11b. The outputs from the detectors 11a and 11b are applied to a differential amplifier 12 so that the difference signal may be derived. The output from the differential amplifier 12 is applied through a compensation circuit 13 to a driver 14 which in turns drives a tracking element 15. The compensation circuit 13 is provided in order to compensate an unexpected deviation appearing in the phase characteristics of a tracking control system.

Figure 2:
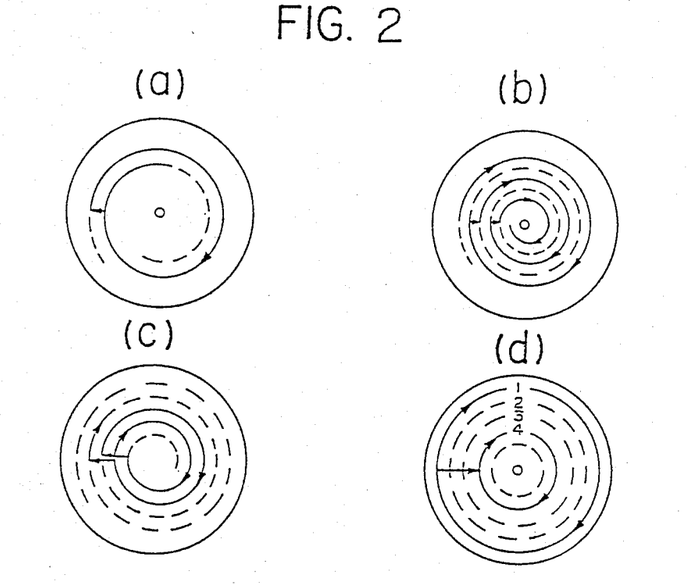

The reflection mirror 5 is mounted on the tracking element 15 so that the light beam 2 focused on the recording medium 7 may scan in the radial direction or in the direction perpendicular to the tracks of the recording medium 7 (See FIG. 2). The tracking element 15 may be substantially similar in construction to a galvanometer or a bimorph cell.

The recording medium 7 is not only rotated by a first motor 16 but also is shifted in the radial direction together with the first motor 16 by means of a second motor 17. The second motor 17 is driven following the output of the driving circuit 19 to which the output of the compensation circuit 13 is applied through a filter 18. The second motor 17 shifts the recording medium 7 supported and driven by the first motor 16 in such a way that the light beam focused on the recording medium 7 is brought on the track on which information to be reproduced is recorded, when the DC voltage applied to the tracking element 15 is zero. More specifically, the second motor 17 is driven in such a way that the tracking element 15 may cause the light beam 2 to follow the track on the recording medium 7 even when a sudden displacement of the track occurs and consequently the average driving voltage applied to the tracking element 15 may become zero.

As described elsewhere, the information signal is recorded in the spiral tracks or the concentric tracks on the recording medium 7. Assume that the video signal for one field or frame is recorded on each 360-degree rotation of a helical track or a concentric track. In the case of the spiral tracks as shown in FIG. 2(a), it is necessary, for the purpose to acquire a still image, to scan the light beam backward by one pitch toward a track which is immediately adjacent to the track on which the light beam is scanning, in the outward direction, every time when the recording medium 7 finishes a 360-degree rotation. In the case of the concentric tracks as shown in FIG. 2(d), however, it is necessary, for the purpose to acquire a still image, to suspend the operation of a mechanism which is designed to cause the light beam to jump toward a track which is immediately adjacent to the track on which the light beam is scanning, in the inward direction. On the other hand, for the purpose to acquire a reproduction at a speed twice as fast as that in the normal reproduction mode, the following steps are necessary. In the case of the spiral tracks, the light beam is caused to jump forward by one pitch toward a track which is adjacent to the track on which the light beam is scanning, in the inward direction, as shown in FIG. 2(b). In the case of the concentric tracks, the light beam is caused to jump forward by two pitches toward a track which is the second from the track on which the light beam is scanning, in the inward direction, as shown in FIG. 2(d). Thirdly, the following steps are necessary for the purpose to realize the reversed motion mode. In the case of the spiral tracks, the light beam is caused to jump backward by two pitches toward a track which is the second from the track on which the light beam is scanning, in the outward direction, as shown in FIG. 2(c). In the case of the concentric tracks, the light beam is caused to jump backward by one pitch toward a track which is adjacent to the track on which the light beam is scanning, in the outward direction.

It is possible to record a still picture on each of the concentric tracks as shown in FIG. 2(d), so that the recorded still picture may be kept for a relatively long period. That is, the recording medium 7 with the concentric tracks may be used as a file for the still image information. In this case, in order to reproduce another still image after one image has been reproduced, the scanning beam must jump from one track (1), for instance, to another track (4), for instance. In this specification, the term "jumping" is used to refer to the operation for causing the scanning beam to jump from one track to another as described above.

Referring back to FIG. 1, A denotes a sync. pulse in response to which a jumping starts, while B is the output from an adder 20 to which the outputs from the amplifiers 10a and 10b are applied. The element denoted as 21 is a jumping stop pulse generator which generates the pulse for stopping the jumping action after the jumping action of the light beam 2 from one track to another completes. The element denoted as 22 is a jumping command circuit which generates the jumping command in response to the sync. signal A and the jumping stop command in response to the output from the jumping stop pulse generator 21. In response to the command from the jumping command circuit 22, a jumping voltage generator 23 generates the output voltage which is applied to the driver 14 which in turn controls the tracking element 15.

The jumping operation will be described in detail below. When the sync. signal A is applied to the jumping command circuit 22, while the scanning beam 2 is tracking or scanning a track, the command circuit 22 generates the jumping command which is applied to the jumping voltage generator 23. The output voltage from the generator 23 is applied to the driver 14 which drives the tracking element 15 in such a way that the scanning beam 2 may be redirected by the reflecting mirror 5 mounted on the tracking element 15 so as to cause a jumping action across one or more tracks in the radial direction to a predetermined track. When the jumping action of the scanning beam 2 to the predetermined track completes, the jumping stop pulse is generated by the pulse generator 21 and is applied to the jumping command circuit 22 which in turns generates the jumping stop command. Then, no jumping voltage is derived from the jumping voltage generator 23 so that the jumping action of the scanning beam 2 is stopped and consequently the light beam 2 keeps scanning the track to which it has jumped.

Figure 3:
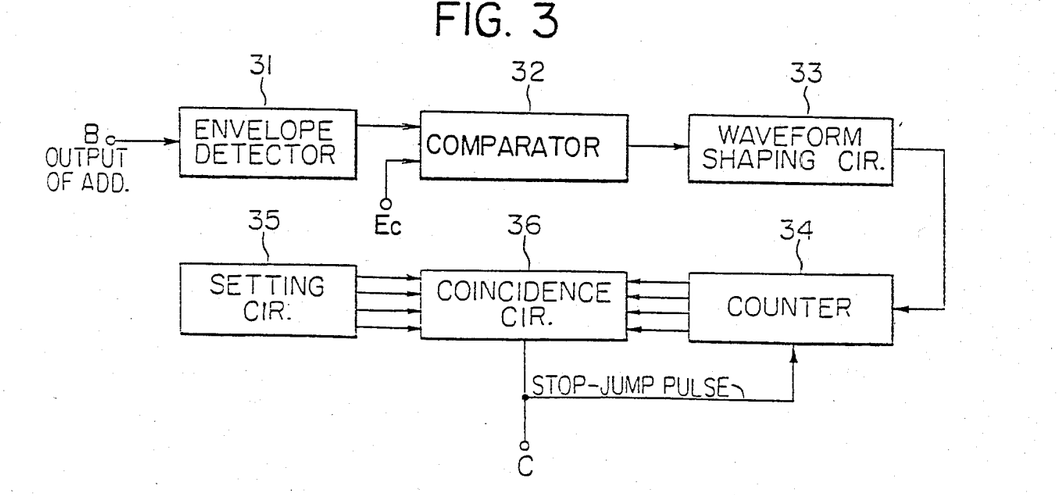
FIG. 3 is a block diagram of a jumping stop pulse generator shown in FIG. 1.

Referring to FIG. 3, the stop jumping pulse generator 21 will be described in detail below. The output B from the adder 20 is applied to an envelope detector 31, and the output from the detector 31 is applied through a comparator 32 and a waveform shaping circuit 33 to a counter 34. The comparator 32 compares the output from the envelope detector 31 with a predetermined threshold voltage Ec and generates a high output voltage, when the former is higher than the latter. The waveform shaping circuit 33 may be assembled employing a monostable-multivibrator which is triggered in response to the rising edge of the output from the comparator 32 so that an output pulse with a predetermined pulse duration may be generated in synchronization with the rising edge of the output from the comparator 32. The output from the counter 34 is applied to a coincidence circuit 36. A jump setting circuit 35 generates the output which represents the number of tracks, to be jumped and which is applied also to the coincidence circuit 36. When the outputs from the counter 34 and the jump setting circuit 35 coincide with each other, the coincidence circuit 36 generates the output pulse; that is, the jumping stop pulse which is applied to the jumping command circuit 22 and to the counter 34 so as to reset it.

Figure 4:
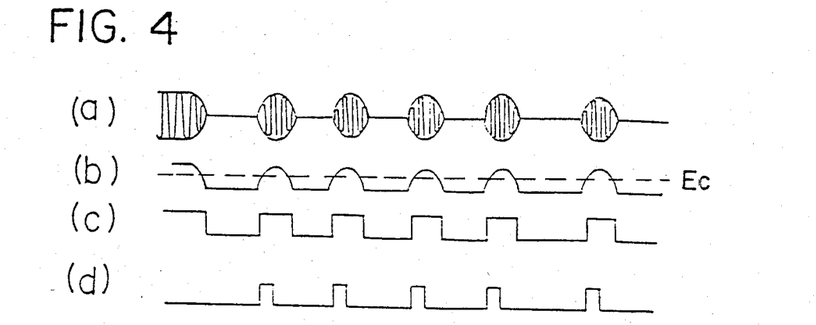
FIG. 4 including (a)-(d) is a view used for explanation of the mode of operation of the jumping stop pulse generator.
Figure 5:
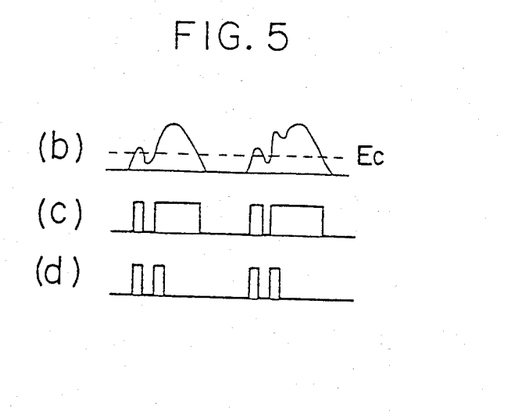
FIG. 5 is a view used for explanation of a potential malfunction of the jumping stop pulse generator.

Referring to FIGS. 4 and 5, the transition progress of signals transmitted from the adder 20 to the waveform shaping circuit 33 will be described below. FIG. 4 compares the waveforms observed at various points of the circuit, during the progress in which the light beam 2 which keeps scanning the tracks, jumps across the tracks. The waveform (a) represents the output of the adder 20. The left end block in the shown waveform (a) represents the output of the track on which the foregoing light beam 2 was scanning. Following the progress in which the light beam moves across the plurality of tracks, a larger pulse height alternates with a smaller pulse height. The waveform (b) represents the output of the envelope detector 31 which detects the envelope of the output of the adder 20. The waveform (c) represents the output of the comparator 32 which compares the output of the envelope detector 31 and a comparator voltage Ec to output a high voltage signal in response to an output of the envelope detector 31 higher than the comparator voltage Ec. The waveform (d) represents the output of the waveform shaping circuit 33 which outputs a pulse signal having a predetermined width and which is triggered in response to the rising edge of an output of the comparator 32. The waveform shaping circuit 33 is composed of astablemultivibrators which are publicly known electronic equipments. Unfortunately, however, cases may be in which the waveform shaping circuit 33 makes an erroneous counting of the number of tracks which the light beam 2 has crossed. Referring to FIG. 5, in the case where the output b of the envelope detector 31 fluctuates with respect to the comparator voltage Ec shown in a broken line, the comparator 32 outputs signal pulses as shown in c, resultantly causing the waveform shaping circuit 33 to produce the output as shown in d. This indicates a possibility in which the waveform shaping circuit 33 erroneously counts in excess of the correct number of tracks which the light beam 2 has crossed. In order to avoid this type of erroneous counting, it is preferable that the comparator 32 is provided with hysteresis characteristics so that a limited magnitude of variable components contained in the output of the envelope detector 31 is prohibited from causing the output of the comparator 32 to make chattering.

The waveshaping circuit 33 is provided in order to avoid erroneous operations of the system. Accordingly, when the output of the comparator 32 is directly applied to the counter 34, the circuit 33 may be eliminated. Furthermore, instead of applying the output B from the adder 20 to the comparator 32, one of the outputs from the detectors 11a and 11b may be applied to the comparator 32. The counter 34, the setting circuit 35 and the coincidence circuit 36 may be made up of counters which are resettable.

Figure 6:
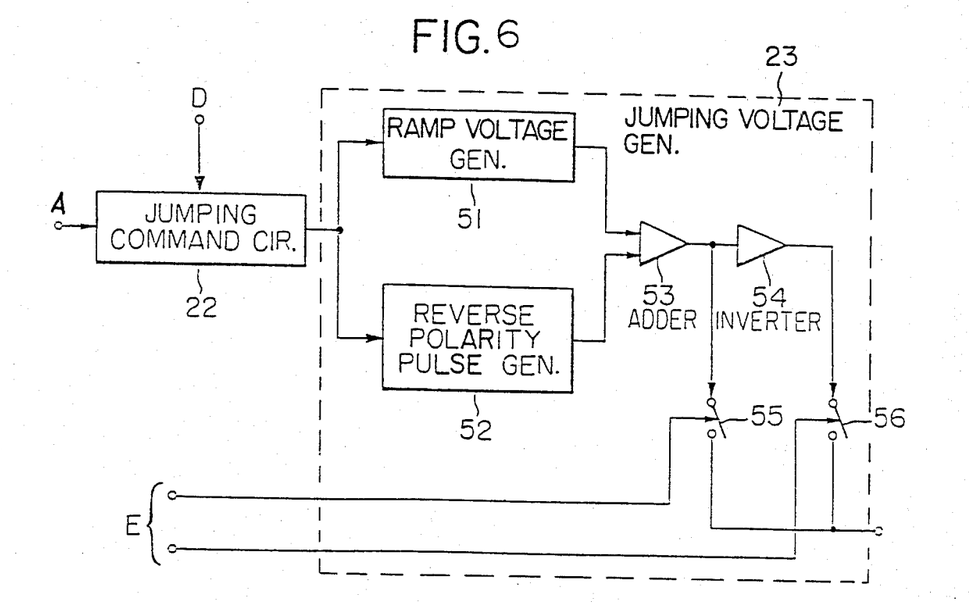
FIG. 6 is a block diagram of a jumping voltage generator shown in FIG. 1.
Figure 7:
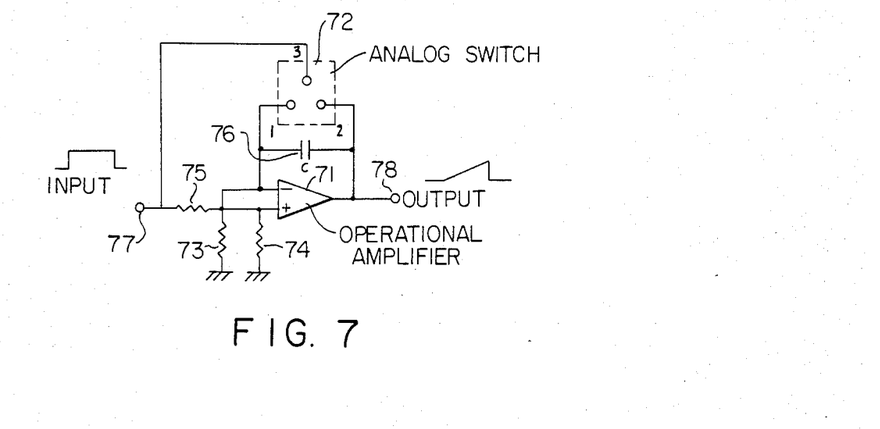
FIG. 7 is a schematic diagram of a ramp voltage generator.

Referring to FIG. 6, an example of a jumping voltage generator 23 will be described below. The jumping voltage generator 23 consists of a ramp voltage generator 51, a reverse polarity pulse generator 52, an adder 53, an inverter 54 and switches 55 and 56. The element denoted as 22 is identical to the jumping command circuit shown in FIG. 1. The jumping command circuit 22 can be assembled employing ordinary flip-flop circuits. The jumping command circuit 22 generates a high level output in response to the sync. signal A which is to initiate a jumping action, and it generates a low level output, when it is triggered by the jumping stop pulse (the output of the jumping stop pulse generator 21). Referring to FIG. 7, the ramp voltage generator 51 can be assembled employing an operational amplifier 71, an analog switch 72, resistors 73, 74 and 75 and a condenser 76. The circuit construction of the ramp voltage generator 51 is one of the publicly known circuits. The INPUT terminal 77 thereof is applied with the output of the jumping command circuit 22. The analog switch 72 functions to open the terminals 1-2 in response to a high level signal applied to the terminal 3 thereof and to close the terminals 1-2 in response to a low level signal applied to the terminal 3 thereof. Accordingly, under the ordinary condition in which a jumping action is not being carried out, the ramp voltage generator 51 outputs a zero voltage, because the jumping command circuit 22 outputs a low level signal (a zero voltage). A sync. signal A shifts the situation to a jumping mode, in which the jumping command circuit 22 outputs a high level signal, which is applied to the terminal 3 to cause the terminal 1-2 to open. This causes the input and output terminals of the operational amplifier 71 to be interconnected by the condenser 76, resultantly allowing the operational amplifier 71 to function as an integrating circuit. Therefore, the high level signal voltage applied to the terminal 77 of the ramp voltage generator 51 is integrated, before being outputted from the output terminal 78 as a ramp voltage. A jumping stop pulse causes the jumping command circuit 22 to output a low level signal again and further causes the analog switch 72 to close the terminals 1-2. Since this causes the INPUT terminal to be applied with a low level signal (a zero voltage), the output of the OUTPUT terminal 78 returns to a zero voltage, terminating the output of a ramp voltage. On the other hand, the reverse polarity pulse generator 52 can be a monostablemultivibrator circuit which is triggered by the falling edge of a signal voltage. In other words, a monostablemultivibrator can be triggered for the purpose to generate a pulse having a predetermined width, by the falling edge of a signal voltage at which the output of the jumping command circuit 22 shifts to a low level from a high level in response to a jumping stop pulse. Assuming that the output terminal of the monostablemultivibrator is a $\overline{Q}$ terminal, a pulse having a negative polarity and having a predetermined width can be readily generated.

In operation, in response to the sync. pulse A, the jumping command circuit 22 generates a high level voltage and triggers the ramp voltage generator 51. In response to a rise of the ramp voltage, the light beam leaves the track that it has been tracking and radially traverses or jumps across some recording tracks substantially perpendicular to the tracks, to reach a desired or designated track. Then, the jumping stop pulse D is applied to the jumping command circuit 22 which in turn resets the ramp voltage generator 51 so that the ramp voltage drops to zero and consequently the velocity of the light beam is decelerated. Concurrently, the jump command circuit 22 triggers the reverse polarity pulse generator (inverted polarity pulse generator) 52 which in turn generates a pulse in response to which the light beam is braked.

The direction of the jumping, namely, the outward or inward direction in which the jumping is made in the radial direction depends on the input E which closes the switch 55 or 56 so that the output from the adder 53 or the inverter 54 may be applied as the input F to the driver 14.

Figure 8:
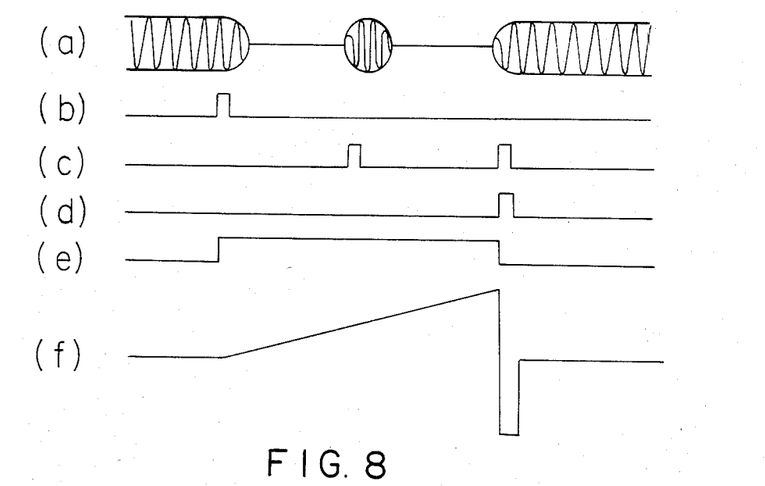
FIG. 8 including (a)-(f) is a view used for explanation of the mode of operation thereof.

The mode of operation of the jumping voltage generator 23 illustrated in FIG. 1 will be described in more detail with further reference to FIG. 8. The setting circuit 35 is assumed to be so set that the scanning beam jumps across two tracks. Referring to FIG. 8, the output from the adder 20 is shown by (a), and the jumping sync. pulse A is shown by (b). The wave-shaping circuit 33 (See FIG. 3) generates one pulse as shown in (c), whenever the scanning beam 2 jumps across one track. The outputs from the coincidence circuit 36 (See FIG. 3), the jumping command circuit 22 and the jumping voltage generator 23 are shown by (d), (e) and (f), respectively. As described previously, the waveform shaping circuit 33 generates a pulse at the instant when the reproduced envelope of the signal being recorded rises above a predetermined level when the light beam is traversing the recording tracks.

As to the time relationship between the output B shown by (a) and the output from the wave-shaping circuit 33 shown by (c), it is preferable that the wave-shaping circuit 33 generates the pulse (See FIG. 8(c)) between the time when the scanning beam 2 reaches one edge of the track to be jumped and the time when the scanning beam 2 reaches the centerline of this track so that the reversely polarized pulse may be generated to stop the jumping action. However, it is also possible to design and construct the waveshaping circuit 33 which generates the pulse (c) between the time when the scanning beam reaches the centerline of the track to be jumped and the time when the scanning beam reaches the other edge of the track. Alternatively, the waveshaping circuit 33 may be so designed and constructed that it generates the pulse (c), when the scanning beam 2 leaves the edge of the track just adjacent to the track to which the scanning beam 2 must jump. In any case, in response to the output from the jumping command circuit 22, the pulse generator 52 is triggered to generate the reversed polarity pulse which serves to stabilize the pulling in of the tracking control system when the jumping action is stopped. That is, when the jumping speed of the light beam 2 is too fast, the light beam may have a possibility to jump beyond the desired track toward an undesired track. Therefore, the voltage with the reverse polarity is applied so that the light beam may be pulled in toward the desired track.

Instead of the waveforms of the jumping and braking voltages shown in FIG. 8(f), any suitable waveform may be employed. That is, any voltage may be used which enables the light beam to jump to a desired track, and it is not necessary to stop the operation of the jumping voltage generator 23 in response to the jumping stop pulse D. The vertical sync. signal of the video signal or the signal obtained by dividing the frequency thereof may be used as the jumping sync. signal A.

In the first embodiment, in order to cause the light or scanning beam 2 to jump in the radial direction or in the direction perpendicular to the tracks on the recording medium 7, the tracking element 15, which is a galvanomirror or the like, and the reflecting mirror 5 are used. Alternatively, as indicated in the broken lines in FIG. 1, a driving element 28, which is of a voice coil type used in a loudspeaker or a linear motor type, may be provided so as to shift the light source 1 in the directions indicated by the arrows, whereby the light beam 2 may be controlled to scan the track or may be jumped in the radial directions. In this case, it is preferable to use a semiconductor laser as the light source 1. Further, in the embodiment illustrated in FIG. 1, low frequency amplifiers employed as the amplifiers 10a and 10b enable elimination of the envelope detector 11a and 11b. In this case, the output of either of the amplifiers 10a and 10b or the differential amplifier 12 is allowed to be employed as the input of the jumping stop pulse generator 21, and the envelope detector 31 shown in FIG. 3 is allowed to be eliminated.

Second Embodiment, FIGS. 9 through 12

Figure 9:
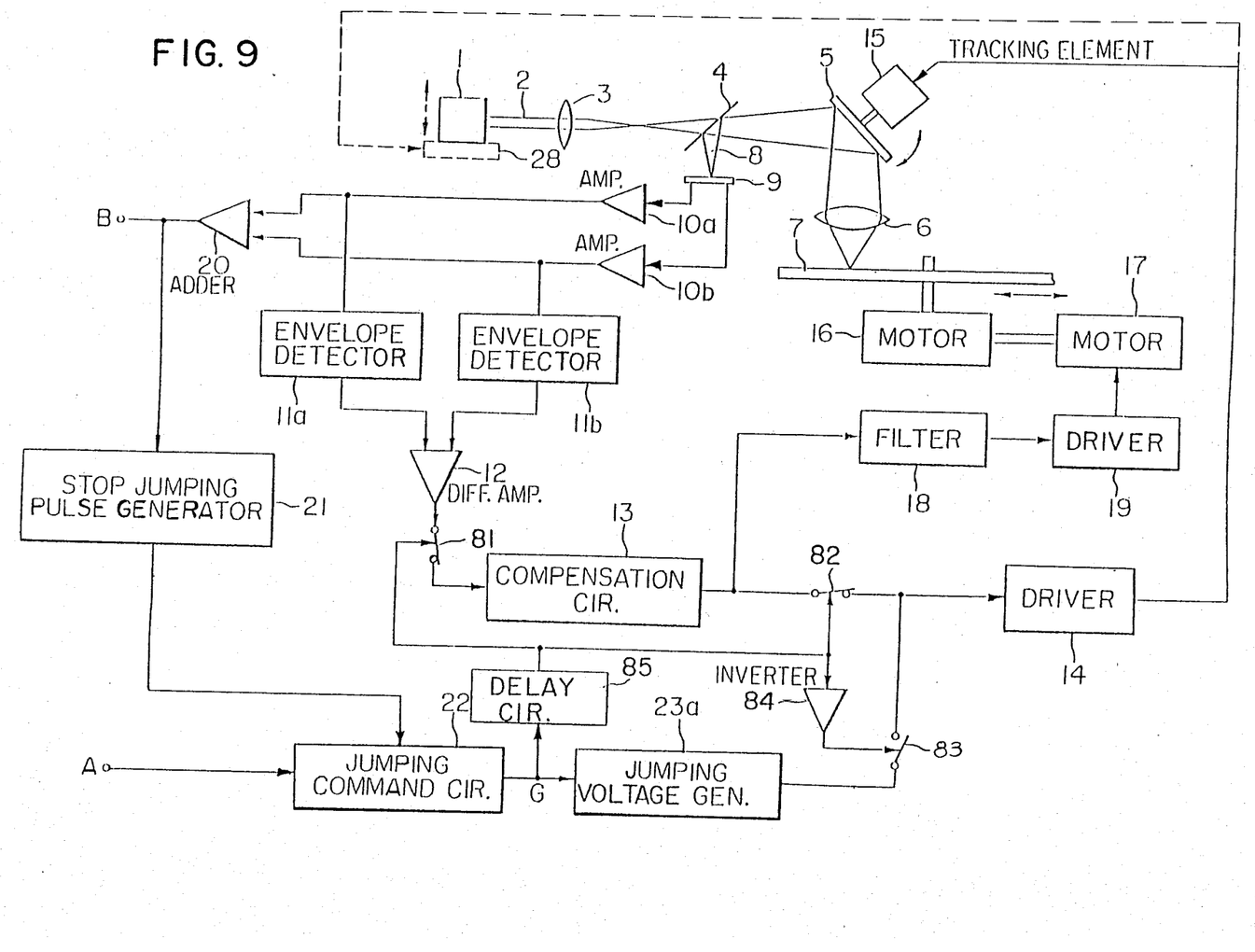
FIG. 9 is a block diagram of a second embodiment of the present invention.

The second embodiment shown in FIG. 9 is substantially similar in construction to the first embodiment described above with reference to FIG. 1, except that the second embodiment is provided with switches 81, 82 and 83, an inverter 84 and a delay circuit 85, some of which replace the corresponding equipments included in the block-diagram shown in FIG. 1 and the other of which are newly introduced to the block diagram shown in FIG. 9. The first and second switches 81 and 82 are opened and closed respectively in response to the output from the delay circuit 85 which delays the output signal of the jumping command circuit 22, thereby the tracking control system is caused to terminate or commence the operation. In response to the output from the inverter 84, which inverts the output from the delay circuit 85, the third switch 83 controls the transmission of the output from the jumping voltage generator 23a to the driver 14. Therefore, it should be noted that when the first and second switches 81 and 82 are closed or opened, the third switch 83 is closed or opened respectively.

The delay circuit 85 commences the operation simultaneously with the commencement of a high level signal voltage outputted by the jumping command circuit 22, and terminates the operation after some predetermined period of time after it outputs a jumping stop signal (a low level signal converted from a high level signal). The delay circuit 85 is a publicly known circuit which can be assembled employing one or more AND circuits and one or more monostable multivibrators. Therefore, no detailed description will be presented for the delay circuit.

When the scanning beam 2 is not jumping, the switches 81 and 82 are closed, while the switch 83 is opened so that the tracking control is being carried out. In response to the jumping sync. pulse A, the jumping command circuit 22 generates the jumping command as described elsewhere. Since the delay circuit 85 delays the command signal, the first and second switches 81 and 82 are opened. Consequently, the tracking control system suspends the operation. During this period, the third switch 83 is kept closed. The jumping voltage from the jumping voltage generator 23a is, therefore, applied through the closed switch 83 to the driver 14 which in turns drives the tracking element 15. The light beam 2 is, therefore, caused to jump to a desired track. After the jump of the light beam 2 to the desired track has been detected, the jumping stop pulse generator 21 generates the jumping stop pulse in the manner described elsewhere so that the jumping command circuit 22 generates the jumping stop command. The jumping stop command is applied to the second switches 81 and 82 through the delay circuit 85 so that the first and second switches 81 and 82 are closed again, whereby the tracking control system resumes the operation, while the third switch 83 is opened.

According to the second embodiment, the tracking control system suspends the operation during the period in which the light beam 2 is jumping, so that the jumping speed of the light beam 2 may be easily controlled and consequently the stable or error-free jumping may be secured.

The jumping voltage which may secure the stable jumping will be described below. When the jumping speed of the light beam 2 is too fast, the tracking control system cannot draw or pull the light beam 2 into a desired track to which the light beam 2 is required to jump. That is, the light beam 2 will not irradiate on a desired track but will jump to another other track erroneously. In order to secure the accuracy in the jumping action, the jumping speed must be selected within the speed range in which the drawing or pulling speed of the tracking control system is readily allowed. To this end, the pulse with the opposite polarity is applied so as to brake the jumping action of the light beam 2. This braking pulse must be changed in shape depending upon the jumping speed of the light beam which is not necessarily uniform. Thus, there must be provided a means for detecting the speed of the light beam 2 and consequently the control system will become very complicated in construction. However, when the light beam 2 is made to shift at a constant speed, the braking pulse in the same shape may be always applied, whereby the control system may be much simplified in construction.

Figure 10:
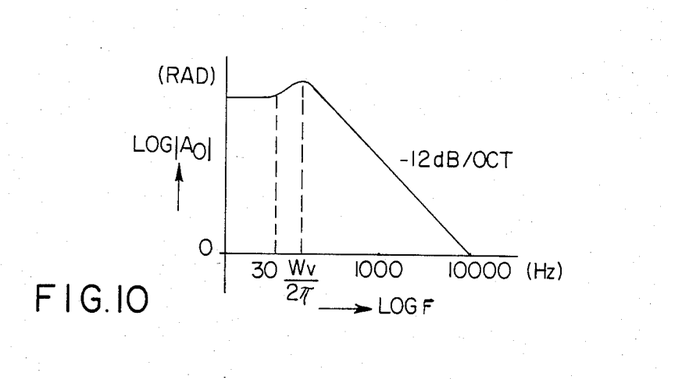
FIG. 10 is a graph showing the rotation angle vs. frequency of a tracking element.

A galvanomirror, a piezo-electricity element or the like can be employed as the tracking element 15. This type of tracking elements has a rotation angle vs. frequency characteristic as shown in FIG. 10, which shows the relation between the rotation angle (radian) of a tracking mirror to be made in response to a voltage applied thereto or a current flowing therein and the frequency of a tracking element. FIG. 10 shows that such a tracking element has the natural frequency or the characteristic frequency of $\omega n/2\pi$ and attenuates at a rate of $-12$ dB/oct. or $-40$ dB/dec. The transmission function G(s) of the output rotation angle with respect to the input voltage applied to such a tracking element can be represented by a quadratic approximation formula shown below:

$$G(s) = \frac{A\omega_n^2}{S^2 + 2\zeta\omega_n S + \omega_n^2}$$

wherein,
   S represents an operator,
   $\zeta$ represents a damping coefficient,
   $\omega_n$ represents a characteristic frequency (shown in rad/s) of a tracking element, and
   A represents a sensitivity or gain shown in rad/v.

Even in the case where a tracking element has the foregoing characteristic, it is possible to compile a formula representing the transmission function G(s) employing variables including an input voltage (shown in volt) and a distance (shown in micrometer) by which the light beam 2 moves along the surface of a recording medium in response to the input voltage. Therefore, a formula substantially identical to that which was shown above can be compiled, when the sensitivity A is represented by a distance by which the light beam 2 moves in response to a rotation of a mirror. Supposing that such a tracking element 15 is employed, it is possible to move the light beam 2 at a constant speed, if a voltage satisfying the following requirements is applied to the tracking element 15. The Laplacean representing the voltage applied to the tracking element 15 is:

$$V(s) = (x/A\omega_n^2) \times (1 + 2\zeta\omega_n/S + \omega_n^2/S^2)$$

wherein,
   V(s) represents a voltage shown in Laplacean, and
   x represents a speed of the light beam moving along the surface of a recording medium 7.

The corresponding function shown with respect to time is:

$$V(t) = L^{-1} V(s)$$
$$= (x/A\omega_n^2)\zeta(t) + (2\zeta x/A\omega_n)U(t) + \frac{x}{A}t$$

wherein,
   $\delta(t)$ represents a delta function satisfying the relations:

$$\delta(t) = \begin{cases} \infty & t = 0 \\ 0 & t = 0, \end{cases}$$

U(t) represents a single step function satisfying the relations:

$$U(t) = \begin{cases} 1 & t \geq 0 \\ 0 & t < 0, \text{ and} \end{cases}$$

t represents a time.

It follows, therefore, that when the voltage which is obtained by combining three voltages including the pulse voltage, the stepping voltage and the ramp voltage, is applied to the tracking element 15, the light beam 2 may jump substantially at a constant speed. In general, $\omega_n$ is of the order of $2\pi \times 30$ (rad/sec) or higher, and the component of the pulse voltage is very small and may be eliminated, but the light beam 2 may jump substantially at a constant speed.

Figure 11:
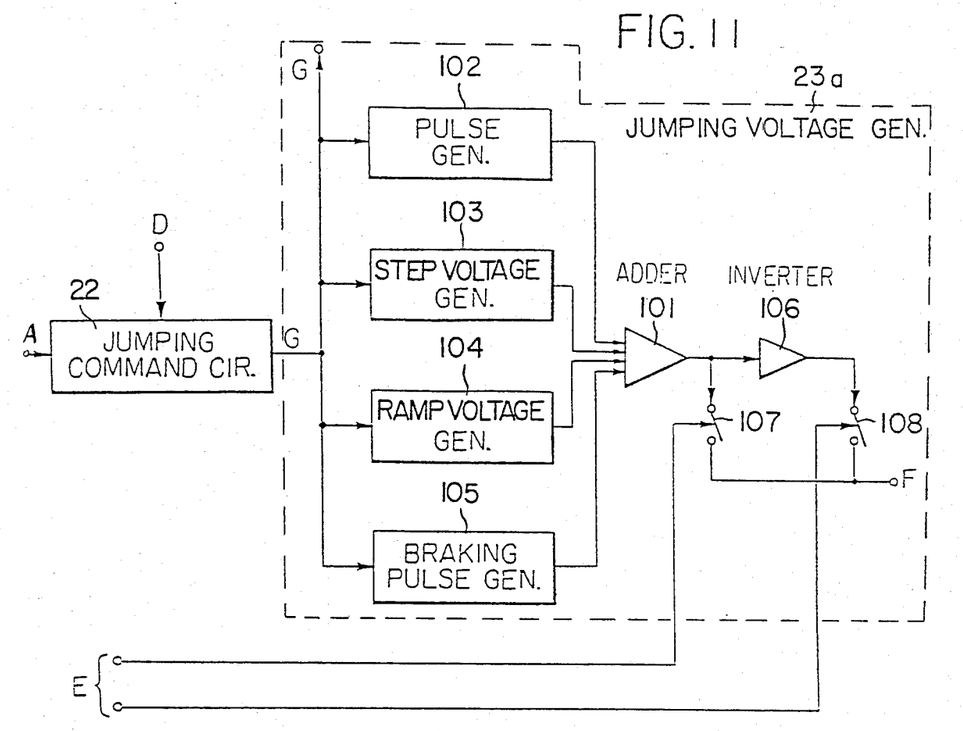
FIG. 11 is a block diagram of a jumping voltage generator used in the second embodiment.

Referring to FIG. 11, the element denoted as 22 is identical to the jumping command circuit shown in FIG. 1. The jumping voltage generator 23a comprises an adder 101, a pulse generator 102, a step voltage generator 103, a ramp voltage generator 104, an inverted-polarity pulse generator or braking pulse generator 105, an inverter 106 and switches 107 and 108. In response to the jumping sync. signal A the jumping command or control circuit 22 generates the jumping command signal in response to which the pulse generator 102, the step voltage generator 103 and the ramp voltage generator 104 are triggered. In response to the jumping stop pulse D, the control circuit 22 generates the jumping stop command in response to which the pulse generator 102, the step voltage generator 103 and the ramp voltage generator 104 are de-energized but the braking pulse generator 105 is triggered.

As described earlier referring to FIG. 6, the jumping command circuit 22 keeps outputting a low level signal, unless it is applied with a sync. signal A. The high level signal initiated by application of the sync. signal A applied to the jumping command circuit 22, returns to a low level signal, when a jumping stop pulse input D is applied to the jumping command circuit 22. The pulse generator 102 which can be one of the publicly known circuits assembled employing monostablemultivibrators, is triggered by a rising edge at which a low level signal is shifted to a high level signal, and generates a positive polarity pulse having a predetermined width. The step voltage generator 103 can be a DC amplifier (or an attenuator) which converts an output voltage of the jumping command circuit to a DC voltage having a convenient amount. The ramp voltage generator 104 and the braking pulse generator 105 can be respectively the corresponding equipment shown in FIG. 6. As was presented in the description for the first embodiment, the direction of the jumping, whether inward or outward in the radial direction, depends upon the signal E. That is, when the switch 107 is closed in response to the signal E, the output from the adder 101 is applied to the driver 14 through the switch 83 which is in a closed position (See FIG. 9). However, when the switch 108 is closed, the output from the inverter 106 is applied to the switch 108.

Figure 12:
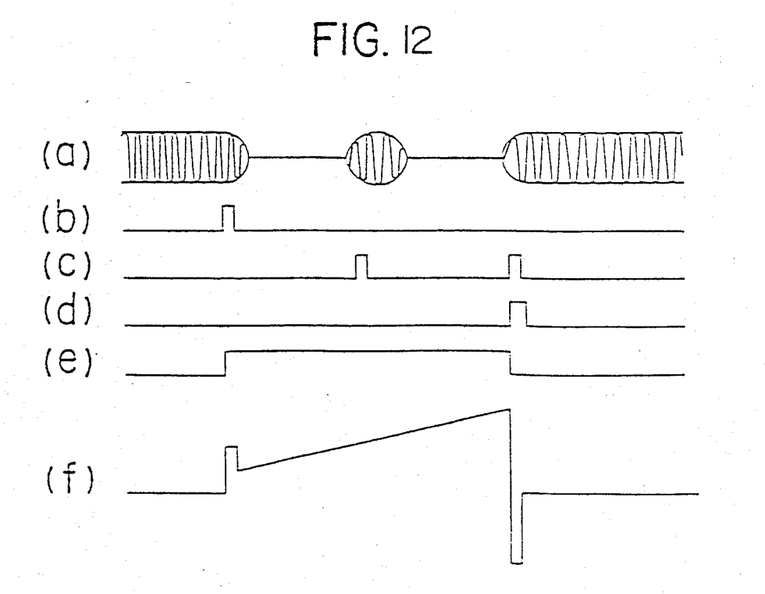
FIG. 12 including (a)-(f) is a view used for explanation of the mode of operation of the jumping voltage generator.

The mode of operation of the jumping voltage generator 23a will be described in more detail with reference to FIG. 12 showing the transition progress of the signals in the case where the light beam 2 jumps two tracks as in the first embodiment. The output B from the adder 20 is shown by (a); the jumping sync. pulse A, by (b); the pulses each of which is generated by the wave-shaping circuit 33 (See FIG. 3) in the instance where the light beam 2 jumps one track, by (c); the output C from the coincidence circuit 36 (See also FIG. 3), by (d); the output from the jumping command circuit 22, by (e); and the output F of the jumping voltage generator 23a, by (f).

It is preferable that the delay circuit 85 has a delay time which is identical to or slightly longer than the length of time during which the braking pulse generator 105 keeps outputting a pulse or the length of time from the time at which the output signal of the jumping command circuit 22 is shifted from a high level to a low level in response to a jumping stop pulse and the braking pulse generator 105 commences the generation of a braking pulse, until the time at which the braking pulse generator 105 terminates the generation of the braking pulse.

The time-wise relations between the waveforms a and c can be recognized to be identical to those described with reference to the former embodiment.

Referring back to FIG. 9, the second switch 82 may be opened or closed first and then the first switch 81 may be opened or closed, rather than the first and second switches are opened or closed simultaneously. Only one switch 82 may be used, rather than the first and second switches 81 and 82 being used. However, when the tracking control system has a high loop gain, the circuit is saturated, when the tracking control system is not in operation. As a result, non-linear operation occurs so that the light beam cannot be pulled or drawn into a desired track. Furthermore, the tracking voltage existing immediately prior to a jumping action may be held and superposed on another jumping voltage so that the stable jumping action may be secured. As in the case of the first embodiment, the vertical sync. signal of the video signal or the signal obtained by dividing the frequency thereof may be used as the jumping sync. signal A.

In the second embodiment, the switch 81 is opened in the case of the jumping of the light beam 2 so that the output from the differential amplifier 12 is not applied to the compensation circuit 13 and consequently the second or radial shift motor 17 is not driven. However, the input of the filter 18 may be connected to the driver 14 so that even in the case of the jumping, the second motor 17 may be operated.

These arrangements available in the first and the second embodiments are advantageous, because the jumping beyond the above-mentioned deflection of the light beam is possible by combining the function of the tracking element with that of the second motor, although the allowed amount of deflection of the light beam by the optical system and the tracking element is restricted to be small.

In the second embodiment, as the jumping velocity of the light beam 2 may be maintained substantially constant as described above, the braking pulse of the same width and amplitude may be applied. As a result, when the tracking control system is closed again, it may draw or pull the light beam to a desired track in a very stable manner. Thus the correct jumping action may be always secured.

In the second embodiment, in order to cause the jumping of the light beam 2 in the radial direction, the tracking element 15 and the reflecting mirror 5 are used, but as described elsewhere in conjunction with the first embodiment, the light source 1 may be so designed and constructed that it shifts in the direction indicated by the arrows by the driving means 28 indicated by the dotted lines so that the radial shift and jumping of the light beam may be realized.

In summary, according to the present invention the light beam is shifted substantially inwardly or outwardly in the radial direction. After the shift or the jumping to a desired track of the light beam has been detected, the tracking control system pulls or draws the light beam to the desired track. Therefore, the stable and correct jumping action may be secured regardless of the variations in track pitch, eccentricity and the like.

The present invention enables the stable reproduction of a picture at a time scale different from that at which the picture was recorded. That is, a still picture, a slow motion picture, a quick motion picture and a back motion picture may be reproduced in a stable manner. Furthermore, still pictures may be recorded on concentric tracks on a recording medium and may be instantaneously retrieved.

The present invention is not limited to the first and second embodiments described above, and it will be understood that various modifications may be further available in the true technical scope of the present invention which should be construed following the appended claims.

What is claimed is:

1. A control system for an optical information reproduction device which reproduces information recorded on spiral or circular information signals tracks produced on a recorded medium comprising:

(a) a transducer means for reproducing information signals recorded on said tracks produced on said recorded medium, said transducer means comprising a light source, an optical system for focusing a light beam emitted from said light source on said recording medium, and a sensing element for reading by sensing the light beam reflected back from said track and identifying a desired signal track at which the light beam from the light source is being focused and reading out the information recorded thereon, (b) a tracking control means for controlling the scanning positon of said transducer means so as to follow the desired track, for the purpose to reproduce the information recorded on said desired track, said tracking control means comprising a tracking actuator for changing the position on which said light beam is focused on said record medium, and a control circuit for controlling said tracking actuator in response to the signal from said transducer means which detects the relative positional relationship between said light beam focused on said recorded medium and said signal track, (c) a track jumping command generating means for generating a track jumping commencement signal, (d) a signal generating means for generating signals including a gradually increasing signal portion for driving said tracking actuator so that the light beam focused on said record medium can be displaced substantially at the same velocity in the direction substantially perpendicular to said signal track, (e) a track detecting means for detecting whether or not said displaced light beam has been brought adjacent a desired signal track, (f) a brake signal generating means for generating said brake signal to decelerate the displacement speed of said light beam displaced by said tracking actuator, whereby said signal generating means is operated in response to said track jumping commencement signal generated by said track jumping command generating means, said tracking actuator is driven in response to said track jumping commencement signal generated by said track jumping command generating means, and said brake signal generating means is controlled in response to the output of said track detecting means.

2. A control system for an optical information reproduction device on a recorded medium defined in claim 1, wherein said tracking control means includes a switching means, said switching means bringing said tracking control means to an inoperative position in response to said track jumping commencement signal, and said switching means bringing said tracking control means back to an operative position in response to the output of said track detecting means.

3. A control system for an optical information reproduction device on a recorded medium defined in claim 1, wherein said track detecting means includes a circuit for detecting the number of tracks which were crossed by said transducer means.

4. A control system for an optical information reproduction device on a recorded medium defined in claim 1, wherein said signal generating means is a ramp voltage generating circuit.

5. A control system for an optical information reproduction device on a recorded medium defined in claim 1, wherein said signal generating means consists of a ramp voltage generating circuit and a rectangular wave voltage generating circuit.

6. A control system for an optical information reproduction device on a recorded medium defined in claim 1, wherein said signal generating means consists of a ramp voltage generating circuit, a rectangular wave voltage generating circuit and a pulse voltage generating circuit.

7. A control system for an optical information reproduction device on a recorded medium defined in claim 1, wherein said tracking actuator is allowed to move said light source.

8. A control system for an optical information reproduction device on a recorded medium defined in claim 1, wherein said tracking actuator is allowed to change the path of said light beam emitted from said light source before said light beam arrives at said recorded medium.

* * * * *